(12) United States Patent
Swift

(10) Patent No.: US 8,949,488 B2
(45) Date of Patent: Feb. 3, 2015

(54) DATA REPLICATION WITH DYNAMIC COMPRESSION

(71) Applicant: Compellent Technologies, Eden Prairie, MN (US)

(72) Inventor: Jeremy Dean Swift, Plymouth, MN (US)

(73) Assignee: Compellent Technologies, Eden Prairie, MN (US)

(*) Notice: Subject to any disclaimer, the term of this patent is extended or adjusted under 35 U.S.C. 154(b) by 0 days.

(21) Appl. No.: 13/768,482

(22) Filed: Feb. 15, 2013

(65) Prior Publication Data

US 2014/0237201 A1   Aug. 21, 2014

(51) Int. Cl.
| | |
|---|---|
| *G06F 3/03* | (2006.01) |
| *G06F 3/06* | (2006.01) |
| *H04L 29/08* | (2006.01) |
| *H04L 29/06* | (2006.01) |

(52) U.S. Cl.
CPC ............ *G06F 3/065* (2013.01); *H04L 67/1095* (2013.01); *H04L 69/04* (2013.01); *H04L 67/2828* (2013.01); *H04L 67/32* (2013.01)
USPC ................................................ 710/33; 710/2

(58) Field of Classification Search
None
See application file for complete search history.

(56) References Cited

U.S. PATENT DOCUMENTS

| | | | |
|---|---|---|---|
| 7,613,945 B2 | 11/2009 | Soran et al. | |
| 7,930,436 B1 | 4/2011 | Znosko | |
| 8,010,668 B1 | 8/2011 | Rothstein et al. | |
| 8,055,894 B2* | 11/2011 | Baker et al. | 713/153 |
| 2005/0188112 A1* | 8/2005 | Desai et al. | 709/247 |
| 2006/0195464 A1* | 8/2006 | Guo | 707/101 |
| 2007/0067373 A1* | 3/2007 | Higgins et al. | 707/206 |
| 2008/0077702 A1* | 3/2008 | Posamentier | 709/232 |
| 2008/0279462 A1 | 11/2008 | Celi, Jr. | |

OTHER PUBLICATIONS

Alapati, Srinath. "Accelerate Replication on Low-Bandwidth Links: SnapMirror Network Compression", Tech OnTap, NetApp, Oct. 2009. Accessed on Feb. 13, 2013 <http://www.netapp.com/us/media/tech-ontap/tot-0910.html> (p. 10-13).

"Data Protection, Disaster Recovery, & Business Continuity", Riverbed Webpage, 2013. Accessed on Feb. 15, 2013 <http://www.riverbed.com/us/solutions/disaster_recovery/> (13 pp.).

(Continued)

*Primary Examiner* — Cheng-Yuan Tseng
(74) *Attorney, Agent, or Firm* — Winthrop & Weinstine, P.A.

(57) ABSTRACT

A method for replicating data between two or more network connected data storage devices, the method including dynamically determining whether to compress data prior to transmitting across the network based, at least in part, on bandwidth throughput between the network connected data storage devices. If it has been determined to compress the data, the method involves compressing the data and transmitting the compressed data over the network. If it has been determined not to compress the data, the method involves transmitting the data, uncompressed, over the network. Dynamically determining whether to compress data may include comparing bandwidth measurements with a predetermined policy defining when compression should be utilized. In some embodiments, the policy may define that compression should be utilized when an estimated time for compressing the data and transmitting the compressed data is less than an estimated time for transmitting the data uncompressed.

19 Claims, 4 Drawing Sheets

(56) References Cited

OTHER PUBLICATIONS

"EMC Data Domain Replicator: A Detailed Review", EMC Corporation, May 2012. Accessed on Feb. 13, 2013 <http://www.emc.com/collateral/software/white-papers/h7082-data-domain-replicator-wp.pdf> (21 pp.).

"WAN Optimization Technologies in EMC Symmetrix Replication Environments: Applied Technology", EMC Corporation, Jan. 2009. Accessed on Feb. 13, 2013 <http://www.google.com/url?sa=t&rct=j&q=wan%20accelerator%20compress%20replication&source=web&cd=1&ved=0CKEBEBYwAA&url=http%3A%2F%2Fwww.netex.com%2Findex.php%2Fdownload_file%2Fview%2F190&ei=SCOT47PG8f2QX27rnRDA&usg=AFQjCNFIU5Hozf8NezINM3laayDWEwuAGQ&cad=rja> (11 pp.).

Herdejurgen, Seann. "rsync feature request: conditional compression", Samba Forum, Jan. 16, 2003, retrieved from the Internet Jun. 5, 2014 URL: <http://lists.samba.org/archive/rsync/2003-January/004796.html>.

International Search Report and Written Opinion for related PCT Application No. PCT/US2014/015942, mailed Jun. 30, 2014 (10 pages).

* cited by examiner

DATA REPLICATION WITH DYNAMIC COMPRESSION

FIELD OF THE INVENTION

The present disclosure generally relates to systems and methods for replicating data in a data storage environment. Particularly, the present disclosure relates to systems and methods for efficiently replicating data between two or more network connected data storage sites or devices in a data storage subsystem or information handling system, with the use of dynamic or on-demand compression, which may be particularly useful in systems with periods of relatively slower network links or connections.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Likewise, individuals and businesses seek additional ways to protect or secure information, so as to improve, for example, reliability, fault tolerance, or accessibility of that information. One such method of protecting information in an information handling system involves replicating or sharing information so as to ensure consistency between redundant resources, such as data storage devices, including but not limited to, disk drives, solid state drives, tape drives, etc. Replication of information, or data, is possible across various components communicatively coupled through a computer network, such as a LAN, WAN, the Internet, etc., so the data storage devices may be, and often desirably are, located in physically distant locations. One purpose of data replication, particularly remote data replication, is to prevent damage from failures or disasters that may occur in one location, and/or in case such events do occur, improve the ability to recover the data.

Oftentimes, in fact, disaster recovery policies demand that sites replicate their data offsite in case of an emergency. However, many remote sites (or remote offices) have a problem with low bandwidth, hindering their ability to complete their business critical replication operations. The low bandwidth may be caused, for example but not limited to, by a slow WAN, periods of high traffic or bandwidth use during the day, a site policy that limits bandwidth for any reason, such as but not limited to, usage statistics, or any number of other reasons.

A traditional method for reducing the strain on bandwidth that replication may cause includes having a policy to always compress the data prior to transmitting it across the network, in an attempt to generally reduce the amount of data being transmitted. However, such a policy of constant compression has its drawbacks. Specifically, compressing the data (and decompressing at the receiving side) consumes CPU time, requires a certain level of hardware cost (e.g., memory cost), and can create latency issues with regard to availability of the replicated data. Additionally, in some cases, the compressed data does not take up less space or the difference in space savings is minimal or negligible. Accordingly, compressing such data can be a significant waste of time and resources.

Accordingly, improved systems and methods for replicating data in a data storage environment are needed, particularly where low bandwidth may be hindering the ability to replicate efficiently. Specifically, what is needed are systems and methods for efficiently replicating data between two or more network connected data storage sites or devices in a data storage subsystem or information handling system, with the use of dynamic or on-demand compression. Such systems and methods could be particularly useful with, but are not limited to use in, systems with relatively slower network links or connections.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

The present disclosure, in one embodiment, relates to a method for replicating data between two or more network connected data storage devices in a data storage subsystem. The method includes dynamically determining whether to compress data prior to transmitting across the network from a first network connected data storage device to a second network connected data storage device based, at least in part, on bandwidth throughput between the first and second network connected data storage devices. If it has been determined to compress the data, the method involves compressing the data and transmitting the compressed data from the first network connected data storage device to the second network connected data storage device. If it has been determined not to compress the data, the method involves transmitting the data, uncompressed, from the first network connected data storage device to the second network connected data storage device. The method may further include transmitting data from the first network connected data storage device to the second network connected data storage device to obtain a measurement indicative of bandwidth throughput between the first network connected data storage device and second network connected data storage device. In further embodiments, transmitting data to obtain a measurement indicative of bandwidth throughput may be periodically repeated in order to obtain a measurement indicative of the bandwidth throughput between the first network connected data storage device and second network connected data storage device at various times. In some cases, the measurements may be taken at predetermined time intervals. In other cases, for example, the measurements may be taken after each time a predetermined amount of data (e.g., every 20 data chunks) has been transmitted over the network. Dynamically determining whether to compress data, in some embodiments, may include comparing the bandwidth measurements with a predetermined policy defining when compression should be utilized. The policy may define that compression should be utilized when an estimated time for compressing the data and transmitting the compressed data is less than an estimated time for transmitting the data uncompressed. The policy may be based on information relating to, but not limited to, an amount of the data, a type of the data, how long it would take to compress the data, a reduction in size of the data expected after compression, how long it would take to transmit the data uncompressed, how long it would take to transmit the data were it compressed, processing capabilities available, and compression algorithms available. The policy may further define different levels of compression aggressiveness for determining the amount of compression aggressiveness to be utilized. In certain embodiments, staggered compression may be used, wherein the policy defines that compression should be utilized for a first portion of the data and not for a second portion of the data so as to stagger the compression for transmission of the data to the second network connected data storage device. One example of staggered compression is to compress only every other data block, or every third data block, in a data set. Regardless of whether compression may be desirable based on the measured throughput, if compression of the data would be substantially negligible, the data may be left uncompressed.

The present disclosure, in another embodiment, relates to an information handling system. The system includes a first data storage site configured to transmit data over a computer network to a second data storage site for replication at the second data storage site, the first data storage site being further configured to dynamically determine whether to compress data prior to transmitting across the network based, at least in part, on a measured bandwidth throughput between the first and second network connected data storage devices. If it has been determined to compress the data, the first data storage site is configured to compress the data and transmit the compressed data over the network. If it has been determined not to compress the data, the first data storage site is configured to transmit the data, uncompressed, over the network. In some embodiments, the first data storage site and the second data storage site are remote from each other. The first data storage site may be further configured for periodically measuring the bandwidth throughput between the first and second network connected data storage devices in order to obtain a measurement indicative of the bandwidth throughput between the first and second network connected data storage devices at a plurality of times. The first data storage site may store one or more predetermined policies for determining whether to compress data. The first data storage site may compare the periodic measurements indicative of bandwidth throughput with the one or more predetermined policies to determine when compression should be utilized. In one embodiment, the one or more policies define that compression should be utilized when an estimated time for compressing the data and transmitting the compressed data is less than an estimated time for transmitting the data uncompressed. In certain embodiments, the first data storage site may use staggered compression, such that compression is utilized for a first portion of the data and not for a second portion of the data so as to stagger the compression for transmission of the data to the second data storage site.

The present disclosure, in yet another embodiment, relates to a method for replicating data between two or more network connected data storage devices in a data storage subsystem. The method includes dynamically determining whether to compress data prior to transmitting across the network from a first network connected data storage device to a second network connected data storage device. Dynamically determining whether to compress any particular data may involve, during the transmission of first data from the first network connected data storage device to the second network connected data storage device, looking ahead to second data and starting compression of the second data, and if compression of the second data has completed at least by the time transmission of the first data from the first network connected data storage device to the second network connected data storage device has completed, then transmitting the compressed second data from the first network connected data storage device to the second network connected data storage device, otherwise transmitting the second data, uncompressed, from the first network connected data storage device to the second network connected data storage device. If compression of the second data would nonetheless be substantially negligible, the second data may be transmitted across the network uncompressed.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

Figure 1:
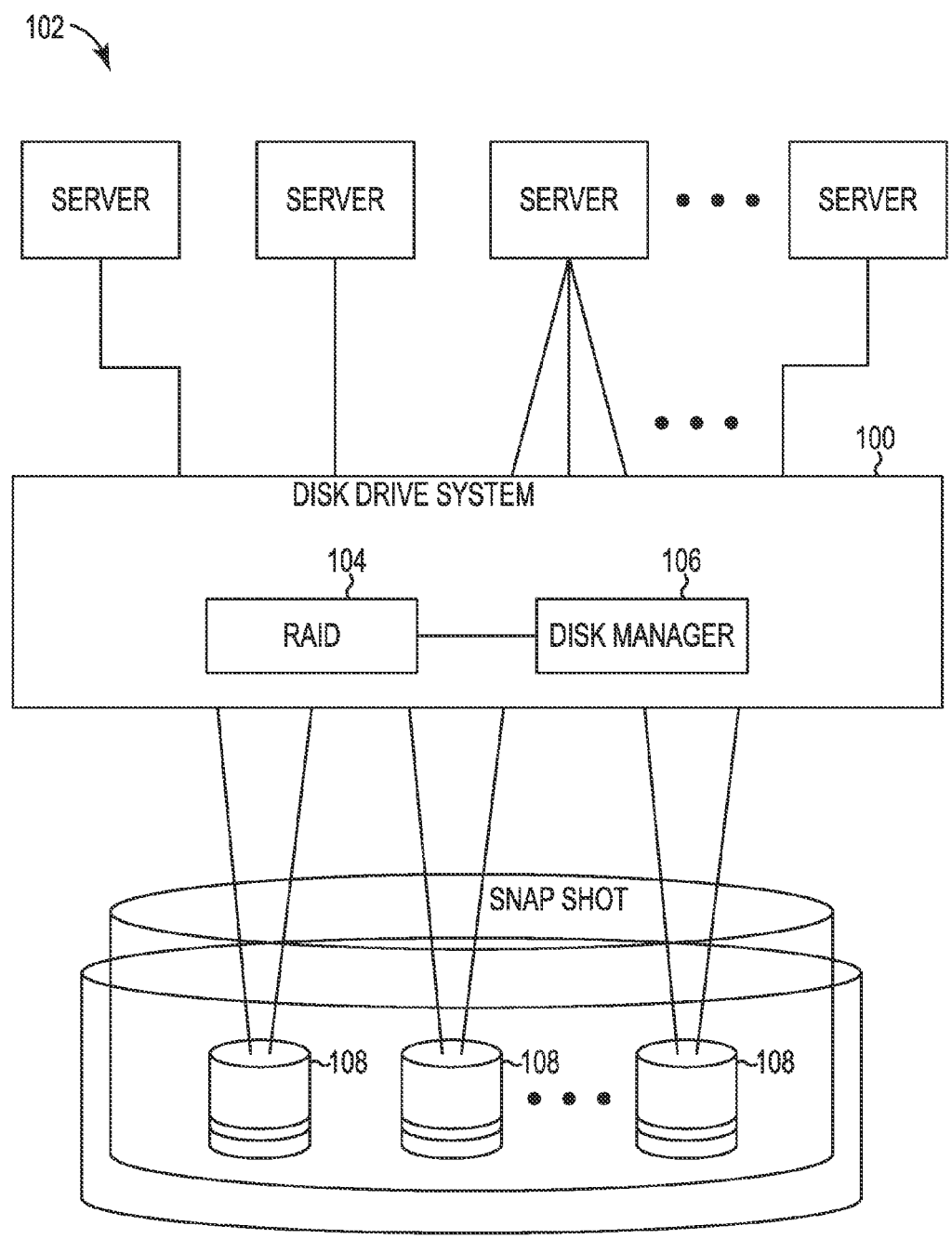
FIG. 1 is a schematic of a disk drive system suitable with the various embodiments of the present disclosure.

The present disclosure relates to novel and advantageous systems and methods for replicating data in a data storage environment. Particularly, the present disclosure relates to novel and advantageous systems and methods for efficiently replicating data between two or more network connected data storage sites or devices in a data storage subsystem or information handling system, with the use of dynamic, or on-demand, compression, which may be particularly useful in systems with periods of relatively slower network links or connections.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

While the various embodiments are not limited to any particular type of information handling system, the systems and methods of the present disclosure may be particularly useful in the context of a disk drive system, or virtual disk drive system, such as that described in U.S. Pat. No. 7,613,945, titled "Virtual Disk Drive System and Method," issued Nov. 3, 2009, the entirety of which is hereby incorporated herein by reference. Such disk drive systems allow the efficient storage of data by dynamically allocating user data across a page pool of storage, or a matrix of disk storage blocks, and a plurality of disk drives based on, for example, RAID-to-disk mapping. In general, dynamic allocation presents a virtual disk device or volume to user servers. To the server, the volume acts the same as conventional storage, such as a disk drive, yet provides a storage abstraction of multiple storage devices, such as RAID devices, to create a dynamically sizeable storage device. Data progression may be utilized in such disk drive systems to move data gradually to storage space of appropriate overall cost for the data, depending on, for example but not limited to, the data type or access patterns for the data. In general, data progression may determine the cost of storage in the disk drive system considering, for example, the monetary cost of the physical storage devices, the efficiency of the physical storage devices, and/or the RAID level of logical storage devices. Based on these determinations, data progression may move data accordingly such that data is stored on the most appropriate cost storage available. In addition, such disk drive systems may protect data from, for example, system failures or virus attacks by automatically generating and storing snapshots or point-in-time copies of the system or matrix of disk storage blocks at, for example, predetermined time intervals, user configured dynamic time stamps, such as, every few minutes or hours, etc., or at times directed by the server. These time-stamped snapshots permit the recovery of data from a previous point in time prior to the system failure, thereby restoring the system as it existed at that time. These snapshots or point-in-time copies may also be used by the system or system users for other purposes, such as but not limited to, testing, while the main storage can remain operational. Generally, using snapshot capabilities, a user may view the state of a storage system as it existed in a prior point in time.

FIG. 1 illustrates one embodiment of a disk drive or data storage system 100 in an information handling system environment 102, such as that disclosed in U.S. Pat. No. 7,613,945, and suitable with the various embodiments of the present disclosure. As shown in FIG. 1, the disk drive system 100 may include a data storage subsystem 104, which may include, but is not limited to, a RAID subsystem, as will be appreciated by those skilled in the art, and a disk manager 106 having at least one disk storage system controller. The data storage subsystem 104 and disk manager 106 can dynamically allocate data across disk space of a plurality of disk drives or other suitable storage devices 108, such as but not limited to optical drives, solid state drives, tape drives, etc., based on, for example, RAID-to-disk mapping or other storage mapping technique. The data storage subsystem 104 may include data storage devices distributed across one or more data sites at one or more physical locations, which may be network connected. Any of the data sites may include original and/or replicated data (e.g., data replicated from any of the other data sites) and data may be exchanged between the data sites as desired.

As will be appreciated by one of skill in the art, the various embodiments of the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, resident software, micro-code, etc.), or an embodiment combining software and hardware aspects. Furthermore, embodiments of the present disclosure may take the form of a computer program product on a computer-readable medium or computer-readable storage medium, having computer-executable program code embodied in the medium, that define processes or methods described herein. A processor or processors may perform the necessary tasks defined by the computer-executable program code. A code segment of the computer-executable program code may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the context of this document, a computer readable medium may be any medium that can contain, store, communicate, or transport the program for use by or in connection with the systems disclosed herein. The computer-executable program code may be transmitted using any appropriate medium, including but not limited to the Internet, wireline, optical fiber cable, radio frequency (RF) signals, or other mediums. The computer readable medium may be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

Computer-executable program code for carrying out operations of embodiments of the present disclosure may be written in an object oriented, scripted or unscripted programming language such as Java, Perl, Smalltalk, C++, or the like. However, the computer program code for carrying out operations of embodiments of the present disclosure may also be written in conventional procedural programming languages, such as the C programming language or similar programming languages.

Various embodiments of the present disclosure are described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks. Alternatively, computer program implemented steps or acts may be combined with operator or human implemented steps or acts in order to carry out an embodiment of the invention.

Additionally, although a flowchart may illustrate a method as a sequential process, many of the operations in the flowcharts illustrated herein can be performed in parallel or concurrently. In addition, the order of the method steps illustrated in a flowchart may be rearranged for some embodiments. Similarly, a method illustrated in a flow chart could have additional steps not included therein or fewer steps than those shown. A method step may correspond to a method, a function, a procedure, a subroutine, a subprogram, etc.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an ingredient or element may still actually contain such item as long as there is generally no measurable effect thereof.

As described above, individuals and businesses seek ways to protect or secure information, so as to improve, for example, reliability, fault tolerance, or accessibility of that information. One such method of protecting information in an information handling system involves replicating or sharing information so as to ensure consistency between redundant resources, such as data storage devices, including but not limited to, disk drives, solid state drives, optical drives, tape drives, etc. Oftentimes, in fact, disaster recovery policies demand data replication, particularly remote data replication, in order to prevent damage from failures or disasters that may occur in one location, and/or in case such events do occur, improve the ability to recover the data. As discussed above, however, many remote sites (or remote offices) have a problem with low bandwidth, hindering their ability to complete their business critical replication operations. The low bandwidth may be caused, for example but not limited to, by a slow WAN, periods of high traffic or bandwidth use during the day, a site policy that limits bandwidth for any reason, such as but not limited to, usage statistics, or any number of other reasons. Bandwidth issues may be further compounded where there are numerous data storage sites scattered over various remote locations, each attempting to replicate data.

A traditional method for reducing the strain on bandwidth that replication may cause includes having a policy to always compress the data prior to transmitting it across the network, in an attempt to generally reduce the amount of data being transmitted. However, such a policy of compression has its drawbacks. Specifically, compressing the data (and decompressing at the receiving side) consumes CPU time, requires a certain level of hardware cost (e.g., memory cost), and can create latency issues with regard to availability of the replicated data. Additionally, in some cases, the compressed data does not take up less space or the difference in space savings is minimal or negligible. Accordingly, compressing such data can be a significant waste of time and resources.

The present disclosure improves processes for replicating data in a data storage system or other information handling system, such as but not limited to the type of data storage system described in U.S. Pat. No. 7,613,945. The disclosed improvements can provide more efficient data replication processes, particularly in systems with relatively slower network links or connections or in systems where there is a significant amount of other communication which should have priority to the available bandwidth.

In general, in one embodiment of the present disclosure, dynamic or on-demand compression permits a data storage system or other information handling system to adapt to changing bandwidth conditions during replication processes, by selectively compressing data for transmitting between sites or devices in a dynamic or on-demand fashion at times when such bandwidth conditions warrant it. Generally, based on bandwidth measurements, data measurements, internal or system policies, and/or other suitable data or system analysis, the data storage system or other information handling system can decide, for a specified amount of time or number of data blocks, or the like, whether to compress data falling within that specified period before transmitting it for replication at another site or device. Accordingly, for example, when bandwidth is high and readily available, and/or where the data to be transmitted would gain little from compression, the data storage system or other information handling system may transmit the data without compression, thereby avoiding the additional time, hardware, and latency costs associated with compression for that data. For example, if the bandwidth is high enough, it may indeed be faster to simply send the data uncompressed or unaltered than to go through time-consuming process of compression. On the other hand, for example, when bandwidth is low, the bandwidth is needed for more essential activities, and/or where the data to be transmitted would gain significantly from compression, the data storage system or other information handling system may compress the data prior to transmission, thereby transmitting the data in a more efficient manner with respect to bandwidth availability. For example, if the bandwidth is low enough, it may indeed be faster to compress the data and send the reduced amount of data over the network than it would be to simply send the data uncompressed or unaltered.

When compressing the data prior to transmission over the network in this manner, several benefits may be achieved. Such benefits include, but are not limited to:

- A replication process that may not otherwise have completed within a required timeframe due to low bandwidth may have a greater chance of completion;
- A replication process will use less of the available bandwidth, thereby leaving bandwidth available for other uses, particularly other more essential uses; and
- Synchronous replication becomes increasingly possible despite latency issues relating to the low bandwidth.

Figure 2:
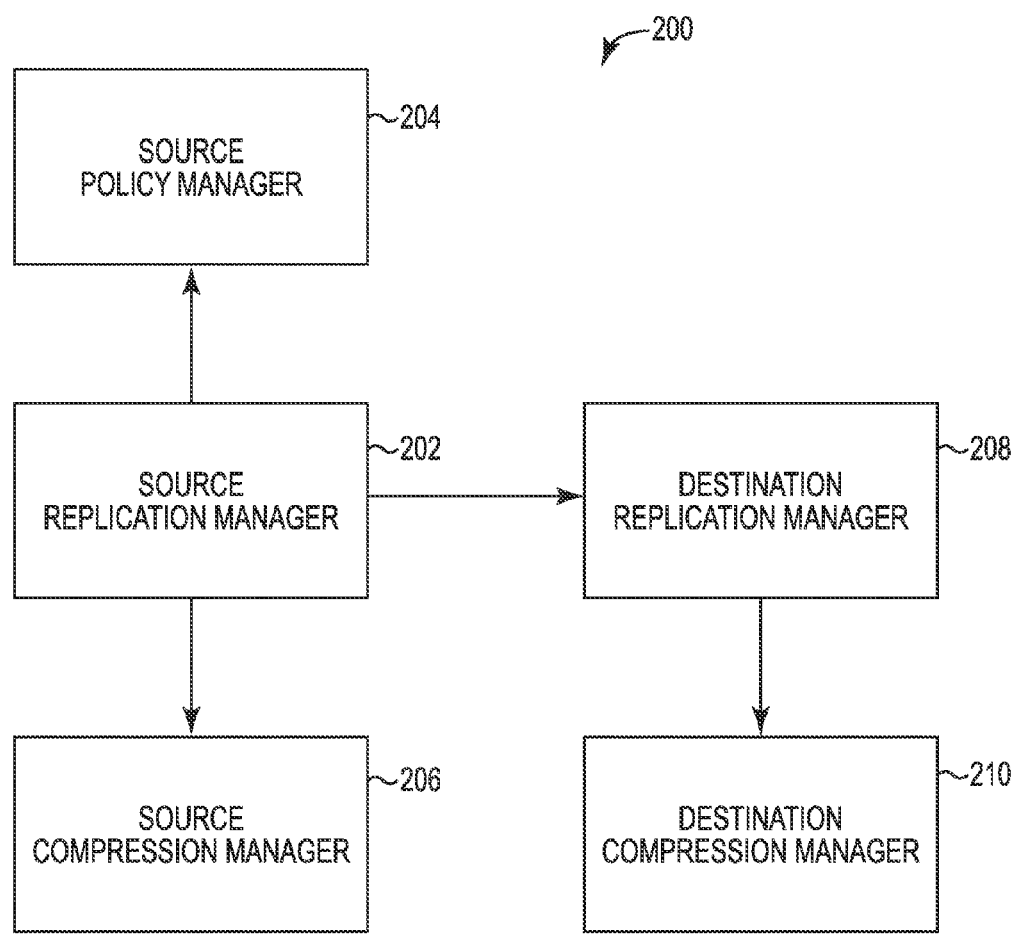
FIG. 2 is a conceptual block diagram of a system for replicating data between two or more network connected data storage sites or devices in a data storage subsystem or information handling system, with the use of dynamic or on-demand compression according to one embodiment of the present disclosure.

As illustrated more particularly in FIG. 2, in one embodiment, a system 200 for data replication utilizing dynamic or on-demand compression may include a source, from which the data is to be transmitted, and a destination, to which the data will be transmitted or at which the data is intended to be received. The source may include a Replication Manager 202, a Policy Manager 204, and a Compression Manager 206. Although illustrated as separate system blocks, it is recognized that the separation of the source Replication Manager 202, source Policy Manager 204, and source Compression Manager 206 in FIG. 2 is for purposes of illustration and discussion only. While the source Replication Manager, source Policy Manager, and source Compression Manager certainly could be separate systems, processes, algorithms, code segments, etc. which may run on the same or different computer hardware, it is recognized that any of the source Replication Manager, source Policy Manager, and source Compression Manager could be part of the same system, process, algorithm, code segment, etc., any of which may run on the same or different computer hardware. The system operation and interaction between the source Replication Manager 202, source Policy Manager 204, and source Compression Manager 206, and thus a method 300 for data replication utilizing dynamic or on-demand compression according to one embodiment of the present disclosure, is described with respect to the flow diagram of FIG. 3. As already stated, while the example method of FIG. 3, and any other method described and illustrated herein, is discussed with respect to certain steps, it is recognized that not every embodiment will include each step illustrated, that some embodiments may include additional steps, and that in other embodiments, the steps may be performed in a different order, and each of such embodiments are considered within the scope of the present disclosure.

Figure 3:
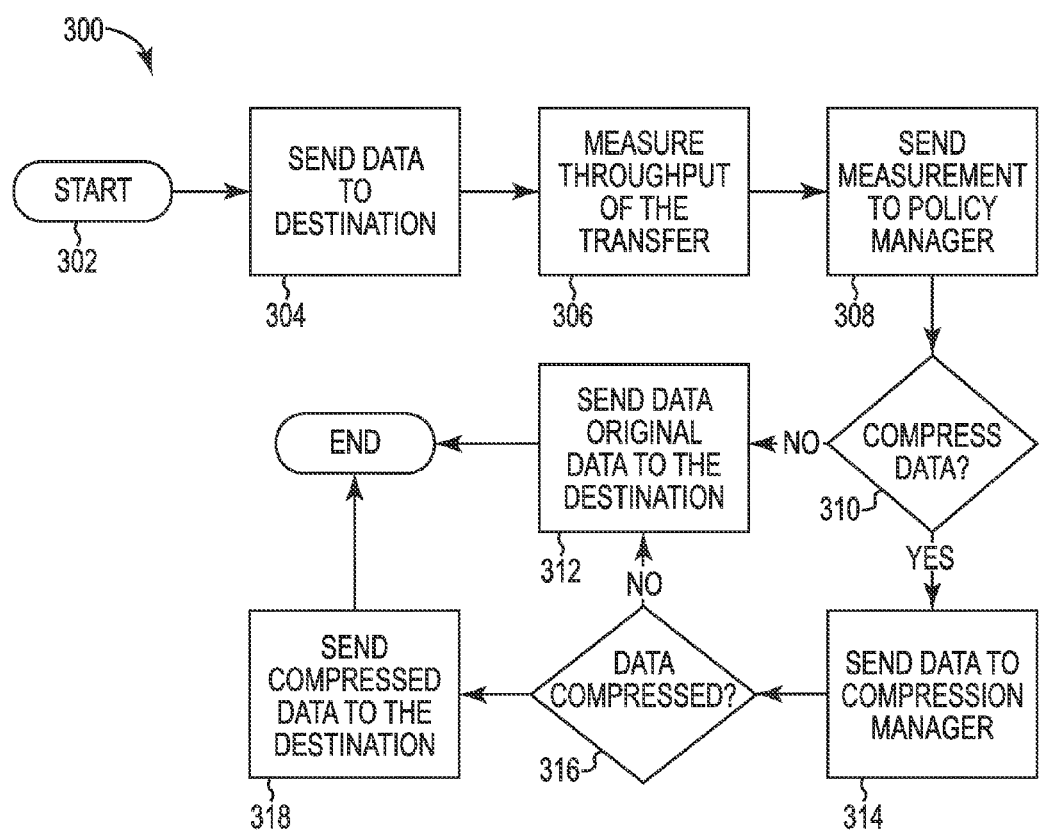
FIG. 3 is a flow diagram a method for replicating data between two or more network connected data storage sites or devices in a data storage subsystem or information handling system, with the use of dynamic or on-demand compression according to one embodiment of the present disclosure.

In accordance with step 302 of the method 300 for data replication utilizing dynamic or on-demand compression illustrated in FIG. 3, for any given set of data, the source may initiate a replication process, in order to, for example, protect or secure information and improve reliability, fault tolerance, or accessibility of that information at redundant resources. In one embodiment, during the replication process, or periodically during the replication process as will be discussed in more detail below, the source Replication Manager 202 may send a sample number of data chunks to the destination 304 over a network connecting the source and destination and take one or more measurements 306, or otherwise obtain or receive one or more measurements, of the available throughput to the destination for the sample number of data chunks. A sample size may be any suitable amount of data or number of data chunks or data blocks, and for example, could be a single chunk of data of any suitable size or any number of continuous or discontinuous data chunks of any suitable size. Additionally, any sample may be differently sized than any other sample, or each sample could be configured as equal in size. A given measurement may generally be indicative of the bandwidth availability between the source and destination at about the time of the measurement. In accordance with step 308, the one or more measurements may be provided to the source Policy Manager 204.

Figure 4:
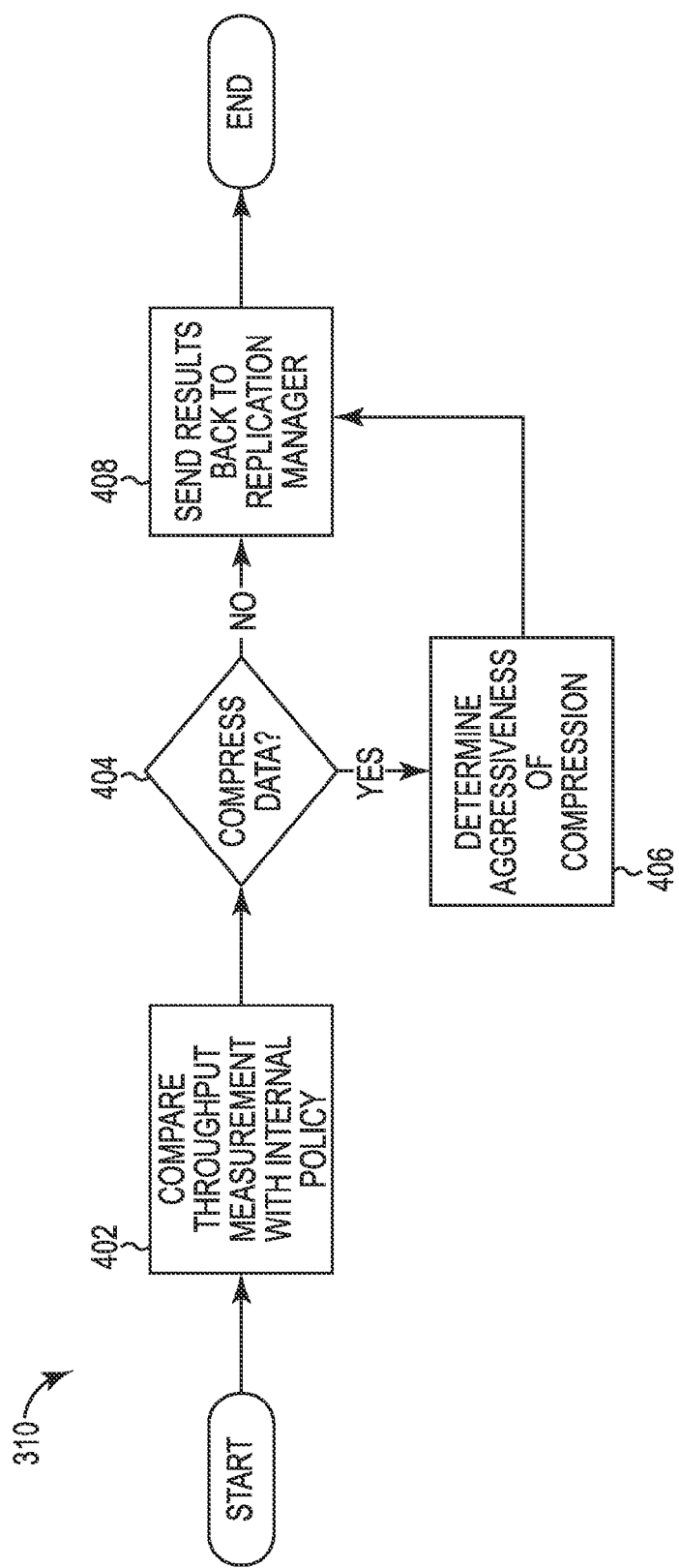
FIG. 4 is a flow diagram of a method for dynamically determining whether to compress data during a given period of time or to compress a given set of data prior to transmission for replication to a destination site or device.

The source Policy Manager 204, in step 310, may generally determine whether to compress the data. A method 310 performed by the source Policy Manager 204 for determining whether to compress the data according to one embodiment of the present disclosure is illustrated in FIG. 4. In general, the source Policy Manager 204 may store and/or maintain one or more policies, guidelines, or rules (collectively referred to herein as "policies" for convenience) for determining whether compression may be desirable for a given set of data or for data being transmitted during a specified period of time. In one embodiment, the source Policy Manager 204 may compare the one or more throughput measurements received from the source Replication Manager 202 against these policies in step 402 and determine whether the data should desirably be compressed in step 404.

In some embodiments, a policy may include one or more threshold values that are used to determine whether it is likely to be faster to compress the data prior to transmitting the data as opposed to simply sending the data uncompressed or unaltered. Such policies may be based on any single piece of information, or combination of information, relating to, but not limited to, the data itself, how long it would take to compress the data (such as, but not limited to, how many CPU cycles it might take), an estimated reduction in size of the data after compression, how long it would take to transmit the data uncompressed and/or unaltered, how long it would take to transmit the data were it compressed, the CPU capabilities available, and/or the compression algorithm/schemes available, etc. For example, in one embodiment, a policy may be based on a comparison of how long it would take to compress and send the data over the network against how long it would take to simply send the data uncompressed or unaltered. An estimate for how long it would take to compress the data may vary depending, for example, on the CPU hardware available for performing the compression and the compression algorithm utilized, or the like. In some embodiments, although certainly not required, such information for determining an estimate of how long it would take to compress a given set of data may be based on a compression scenario assuming the given data set is a worst case data set, such that the estimate obtained is generally the worst possible case (i.e., the longest length of time for compression) for the given data set, which, in some cases, can help the source Policy Manager 204 make a more informed determination regarding whether to compress. However, the determination does not need to be based on a worst case scenario, and could instead be based on a best case scenario or any average between the worst and best case.

As illustrated in step 406, if it has been determined that compression is desirable, the one or more threshold values may also define one or more tiers or levels of aggressiveness for the compression that may be used to determine the particular amount or aggressiveness that may be the most suitable or appropriate for compressing data during a given period of time or for a given set of data. For example, if a first particular threshold is met, mild compression may be used while if a second particular threshold is met, more aggressive compression may be utilized. The tier thresholds may be based on any suitable information, such as but not limited to, the information described above for the policies in generally determining whether compression should be completed. In still further embodiments, the policies for generally determining whether compression should be completed and the policies for determining the level of aggressiveness may be one and the same and, despite being illustrated separately in FIG. 4, may indeed be performed together in some embodiments. Having such tiers or levels of compression aggressiveness can allow, for example, for tighter or more aggressive compression during periods of time where traffic in the network is moving at a relatively slower rate and for faster or less aggressive compression during periods of time when the traffic in the network is moving at a relatively faster rate. Any number of thresholds and various levels of compression may be defined and/or utilized and is not limited by the examples of "mild" and "aggressive" compression provided above.

In still another embodiment, which is not limited in use to, but may be particularly useful where the measurement or measurements for sending the data unaltered or compressing and sending the compressed data are close or substantially equal, or in cases where the measurements are bouncing back and forth between which is faster, a form of staggered compression may be utilized. In an embodiment of staggered compression, the compression algorithm may be utilized to compress some data chunks of a data set but not others in the data set. For example, the compression algorithm may be utilized to compress every other data chunk of a data set, every third data chunk of a data set, or some other similar pattern of skipping some data chunks and not others in a data set. It is also recognized that the selection of which data chunks are compressed and which ones are not need not be based on a pattern; rather, selection of the data chunks for compression in a staggered compression algorithm could be made based on any rationale, including randomly. Staggered compression permits time for compression of certain data chunks to complete while other non-compressed data chunks are transmitted, thereby permitting yet another level of efficient replication.

In still another additional or alternative embodiment, and which may be particularly useful in conjunction with a staggered compression algorithm, compression trials may be utilized that look ahead to the next data chunk or set of data (referred to herein as "look-ahead data chunk," for convenience) and simply begin compressing it. If the compression of the look-ahead data chunk completes by the time transmission of the current data chunk or data set is finished, the compressed version of the look-ahead data chunk can be sent immediately thereafter. If the compression of the look-ahead data chunk is not completed by the time transmission of the current data chunk or data set is finished, the original, uncompressed version of the look-ahead data chunk can be sent. This process can be repeated for each look-ahead data chunk or set of data, with the possible results including:

All data chunks will be compressed prior to sending. This may happen where the compression of the look-ahead data chunk always completes by the time the current data chunk or data set has finished transmitting;

All data chunks will not be compressed. This may happen where the compression of the look-ahead data chunk never completes by the time the current data chunk or data set has finished transmitting;

Some data chunks will be compressed and while others will not. This may happen where the compression of some of the look-ahead data chunks completes by the time the current data chunk or data set has finished transmitting, and thus the compressed version of the look-ahead data chunk is sent, while the compression of other look-ahead data chunks does not complete by the time the current data chunk or data set has finished transmitting, and thus the original, uncompressed version of the look-ahead data chunk is sent.

If none of the one or more thresholds for determining compression would be desirable is met, then in step 404, it may instead be deemed that the throughput between the source and destination is sufficient, at least at that time period or for that particular set of data, and a compression step can be avoided or skipped during that period of time or for that set of data.

In step 408, once the source Policy Manager 204 has determined whether compression would be suitable or desirable, and in some cases, the amount or aggressiveness of compression that may be suitable or most suitable, it may transmit its determination to the source Replication Manager 202, and the source Replication Manager may perform, or cause to be performed, the appropriate steps in accordance with the determination of the source Policy Manager 204. If it has been determined that compression is not desirable at that time and/or for that data or set of data, the source Replication Manager 202 may simply transmit the data uncompressed and/or unaltered to the destination in step 312. If it has been determined that compression should be performed or may be desirable at that time and/or for that data or set of data, the source Replication Manager 202 may pass the specified data or set of data to the source Compression Manager 206 in step 314 for compression prior to transmitting the data to the destination.

After receiving data, and corresponding instructions if necessary or desirable, from the source Replication Manager 202, the source Compression Manager 206 may attempt to compress the specified data, and in some cases as discussed above, at the determined amount or aggressiveness of compression. A determined level or aggressiveness of compression may translate at the source Compression Manager 206 to a particular compression algorithm/scheme or combination of algorithms/schemes, or to a particular level of aggressiveness within an algorithm/scheme or combination of algorithms/schemes, as should be appreciated by those skilled in the art. After the data is compressed, the Compression Manager 206 may wrap the compressed data in a header that describes how to decompress the data. For example, the header may include, but is not limited to including, the algorithm used or information about the algorithm used, metadata describing the original data, a checksum to validate the decompression, or any other suitable information that may be useful in reconstructing and/or verifying the data at the destination.

In step 316, after the compression is appropriately completed, the source Compression Manager 206 may pass the compressed data back to the source Replication Manager 202 for transmission to the destination in step 318. In some cases, the source Compression Manager 206 may determine that the data is not compressible, for example, where the data is already in its smallest or most compressed form and compression would not significantly reduce the size of the data. If the data has been deemed as not compressible in step 316, which may be determined based on any suitable reason, the source Compression Manager 206 may notify the source Replication Manager 202 to transmit the original data uncompressed and/or otherwise unaltered in step 312. Of course, as stated above, it is certainly recognized that any of the source Replication Manager, source Policy Manager, and source Compression Manager could be part of the same system, process, algorithm, code segment, etc., any of which may run on the same or different computer hardware. Accordingly, any passing of data or information between the source Replication Manager, source Policy Manager, and source Compression Manager could simply be symbolic where one or more of the source Replication Manager, source Policy Manager, and source Compression Manager are part of the same system, process, algorithm, code segment, etc. Even where the source Replication Manager, source Policy Manager, and source Compression Manager are not all part of the same system, process, algorithm, code segment, etc., and/or run on different computer hardware, it is recognized that some or all of the actions performed at one of the source Replication Manager, source Policy Manager, and source Compression Manager described in detail above could additionally or alternatively be performed by any of the other source Managers.

If compressed data is received back from the source Compression Manager 206, as stated above, the source Replication Manager 202 may send the compressed data to the destination in step 318. The destination may include a Replication Manager 208 and a Compression Manager 210. Again, although illustrated as separate system blocks, it is recognized that the separation of the destination Replication Manager 208 and destination Compression Manager 210 in FIG. 2 is for purposes of illustration and discussion only. While the destination Replication Manager and destination Compression Manager certainly could be separate systems, processes, algorithms, code segments, etc. which may run on the same or different computer hardware, it is recognized that the destination Replication Manager and destination Compression Manager could be part of the same system, process, algorithm, code segment, etc., any of which may run on the same or different computer hardware.

The destination Replication Manager 208 may receive and store the data transmitted from the source Replication Manager 202. If the data received has been compressed, the destination Replication Manager 208 may store the data, if even temporarily, in its compressed form, or it may decompress the data generally immediately to make the data generally immediately available for access. In this regard, compressed data that is received at the destination Replication Manager 208 may be passed to the destination Compression Manager 210. The destination Compression Manager 210 may decompress the data. The destination Compression Manager 210 may utilize the header data in order to determine how to decompress the data. As stated above, for example, the header data may include, but is not limited to including, the algorithm used or information about the algorithm used, metadata describing the original data, a checksum to validate the decompression, or any other suitable information that may be useful in reconstructing and/or verifying the data.

In some embodiments, where compressed data received by the destination Replication Manager 208 has not been generally immediately decompressed, but rather has been stored in its compressed form, the destination Replication Manager 208 and/or destination Compression Manager 210, or any other suitable part of the data storage system or other information handling system may decompress the data upon a request for access to the data (e.g., a read or write request). Upon such request, the data may be temporarily decompressed during the period in which the data is being accessed and then recompressed, or the data may be left decompressed even past the period during which the data is being accessed.

In still further embodiments, if the compressed data is to be replicated to another system or device, the compressed data may remain compressed until after replication to the further system or device is complete. Such further system or device may be similar to the destination described above, and may include the same or similar Managers and/or perform the same or similar operations as those described above.

As indicated above, it is certainly recognized that the destination Replication Manager and destination Compression Manager could be part of the same system, process, algorithm, code segment, etc., any of which may run on the same or different computer hardware. Accordingly, any passing of data or information between the destination Replication Manager and destination Compression Manager could simply be symbolic where the destination Replication Manager and destination Compression Manager are part of the same system, process, algorithm, code segment, etc. Even where the destination Replication Manager and destination Compression Manager are not part of the same system, process, algorithm, code segment, etc., and/or run on different computer hardware, it is recognized that some or all of the actions performed at one of the destination Replication Manager or destination Compression Manager described in detail above could additionally or alternatively be performed by the other destination Manager.

As discussed above, during the replication process, the source Replication Manager 202 may periodically take one or more measurements, or receive one or more measurements, of the available throughput to the destination for a sample number of data chunks transmitted to the destination and pass this information to the Policy Manager 204 for determining whether compression would be desirable. As will be appreciated, for any given period or for any given data chunk or set of data, the source Policy Manager 204 may adapt to the changing circumstances and change its determination as to whether compression should be completed for that period of time or for that data chunk or data set. In this regard, the source Policy Manager 204 and source Compression Manager 206 may change their behavior in a dynamically or in an on-demand manner in order to transmit data for replication more efficiently.

The times at which the source Replication Manager 202 takes a measurement, of the period of time between measurements, may be based on any suitable rationale or trigger, including but not limited to, a predetermined schedule, after every certain number of data chunks or blocks, triggered manually by an administrator, triggered automatically by the data storage subsystem or a controller or other processing device located at one of the data sites and for any reason, triggered automatically based on a triggering event, or determined on a random basis. A triggering event could be any type of event, including but not limited to, a particular date and/or time, a particular type and/or size of data, increased or decreased network activity, when a particular level of network bandwidth is available, a transition from peak time to non-peak time, or vice versa, based on, for example, historical data or standardized data relating to peak times, or any combination of events, etc. In some embodiments, any of the methods for data replication of the present disclosure may be run generally continuously or semi-continuously, for example, as a background process of the data storage subsystem. In some embodiments, as used herein, the terms continuously and semi-continuously may be defined by the typical understanding of those terms as used in the art or defined by well-known dictionaries. For example, the term continuously may be defined as an uninterrupted extension in space, time, or sequence, and the term semi-continuously may be defined as a substantially uninterrupted extension in space, time, or sequence. In other embodiments, the term continuously may refer to embodiments of the present disclosure that are configured to run one or more data replication processes, simultaneously, sequentially, or both, over an extended period of time, such as for more than two consecutive hours, and are generally given the ability to consume resources without interruption for substantially the entire period of time. Similarly, in other embodiments, the term semi-continuously may refer to embodiments of the present disclosure that are configured to run one or more data replication processes, at least periodically, over an extended period of time, such as for more than two consecutive hours, and are generally given the ability to consume resources for at least more than half the time. Additionally, any of the various embodiments for data replication of the present disclosure may be configured so as to run compression more or less aggressively, as desired, during periods of relatively increased system activity and more or less aggressively, as desired, during periods of relatively decreased system activity, so as not to significantly impact or interfere with normal or regular system performance or utilize significant amounts of network bandwidth that could otherwise be used for other system activity. Further, while any of the various embodiments for data replication of the present disclosure may be run generally continuously or semi-continuously, it is recognized that the data replication processes need not run at a consistent level for the entire period of time they are running continuously or semi-continuously and, indeed, could be periodically halted and restarted at various times for any desired or suitable reason, such as but not limited to, by administer request or based on system demand. In still further embodiments, any of the various embodiments for data replication may be run based on a predefined periodic schedule, such as but not limited to, at a specified time each day or week.

The various embodiments of the present disclosure relating to systems and methods for replicating data between two or more network connected data storage sites or devices in a data storage subsystem or information handling system, with the use of dynamic or on-demand compression provide significant advantages over conventional systems and methods for replicating data, which either do not compress data or rely on a policy requiring compression of all data transmitted over the network or other connection for replication. For example, the various embodiments of the present disclosure may benefit from the advantages provided by compression while avoiding many of the drawbacks associated with a policy requiring compression for all transmitted data, such as excessive consumption of CPU time, certain latency issues with regard to the immediate availability of the replicated data, and compressing data where the space savings is minimal, negligible, or non-existent.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

We claim:

1. A method for replicating data between two or more network connected data storage devices in a data storage subsystem, the method comprising:

dynamically determining whether to compress data prior to transmitting across the network from a first network connected data storage device to a second network connected data storage device based on a policy, the policy based, at least in part, on bandwidth throughput between the first and second network connected data storage devices, an estimated data compression time for the data, and an estimated reduction in size of the data after compression; and if it has been determined to compress the data, compressing the data and transmitting the compressed data from the first network connected data storage device to the second network connected data storage device;

else if it has been determined not to compress the data, transmitting the data, uncompressed, from the first network connected data storage device to the second network connected data storage device.

2. The method of claim 1, further comprising transmitting data from the first network connected data storage device to the second network connected data storage device to obtain a measurement indicative of bandwidth throughput between the first network connected data storage device and second network connected data storage device.

3. The method of claim 2, further comprising periodically repeating the step of transmitting data to obtain a measurement indicative of bandwidth throughput in order to obtain a measurement indicative of the bandwidth throughput between the first network connected data storage device and second network connected data storage device at a plurality of times.

4. The method of claim 3, wherein the step of transmitting data to obtain a measurement of bandwidth throughput is repeated after a predetermined time interval.

5. The method of claim 3, wherein the step of transmitting data to obtain a measurement of bandwidth throughput is repeated after a predetermined amount of data has been transmitted from the first network connected data storage device to the second network connected data storage device.

6. The method of claim 3, wherein dynamically determining whether to compress data comprises comparing a measurement indicative of bandwidth throughput with the policy defining when compression should be utilized.

7. The method of claim 1, wherein the policy defines that compression should be utilized when a combination of the estimated data compression time and an estimated time for transmitting the compressed data is less than an estimated time for transmitting the data uncompressed.

8. The method of claim 7, wherein the policy is based on information relating to at least one of an amount of the data, a type of the data, how long it would take to compress the data, a reduction in size of the data expected after compression, how long it would take to transmit the data uncompressed, how long it would take to transmit the data were it compressed, processing capabilities available, and compression algorithms available.

9. The method of claim 8, wherein the policy further defines levels of compression aggressiveness for determining the amount of compression aggressiveness where it has been determined to utilize compression for the data.

10. The method of claim 6, wherein the policy defines that compression should be utilized for a first portion of the data and not for a second portion of the data so as to stagger the compression for transmission of the data to the second network connected data storage device.

11. The method of claim 1, further comprising where if the estimated amount of compression in the size of the data would be substantially negligible, determining not to compress the data prior to transmitting across the network from the first network connected data storage device to the second network connected data storage device.

12. An information handling system comprising:
a first data storage site configured to transmit data over a computer network to a second data storage site for replication at the second data storage site, the first data storage site being further configured to dynamically determine whether to compress data prior to transmitting across the network based on a policy, the policy based, at least in part, on a measured bandwidth throughput between the first and second network connected data storage devices and an estimated data compression time for the data, wherein
if it has been determined to compress the data, the first data storage site is configured to compress the data and transmit the compressed data over the network;
else if it has been determined not to compress the data, the first data storage site is configured to transmit the data, uncompressed, over the network;
and wherein at least a portion of compressed data transmitted over the computer network to the second data storage site for replication is stored at the second data storage site in its compressed format until a request for access to that data is received.

13. The information handling system of claim 12, wherein the first data storage site and the second data storage site are remotely connected via the computer network.

14. The information handling system of claim 13, wherein the first data storage site is further configured for periodically measuring the bandwidth throughput between the first and second network connected data storage devices in order to obtain a measurement indicative of the bandwidth throughput between the first and second network connected data storage devices at a plurality of times.

15. The information handling system of claim 14, wherein the first data storage site stores the policy for determining whether to compress data, and the first data storage site is configured to compare the periodic measurements indicative of bandwidth throughput with the policy to determine when compression should be utilized.

16. The information handling system of claim 12, wherein the policy defines that compression should be utilized when a combination of the estimated data compression time and an estimated time for transmitting the compressed data is less than an estimated time for transmitting the data uncompressed.

17. The information handling system of claim 16, wherein the policy further defines that compression should be utilized for a first portion of the data and not for a second portion of the data so as to stagger the compression for transmission of the data to the second network connected data storage device.

18. A method for replicating data between two or more network connected data storage devices in a data storage subsystem, the method comprising dynamically determining whether to transmit compressed data across the network from a first network connected data storage device to a second network connected data storage device, wherein dynamically determining whether to transmit compressed data comprises:
during the transmission of first data from the first network connected data storage device to the second network connected data storage device, starting compression of second data; and
subsequently, if the compression of the second data has completed by the time the transmission of the first data from the first network connected data storage device to the second network connected data storage device has completed, then transmitting the compressed second data from the first network connected data storage device to the second network connected data storage device, otherwise transmitting the second data, uncompressed, from the first network connected data storage device to the second network connected data storage device.

19. The method of claim 18, further comprising where if a total amount of compression in the size of the second data would be substantially negligible, determining not to compress the second data prior to transmitting across the network from the first network connected data storage device to the second network connected data storage device.

* * * * *